Aug. 4, 1931.   L. KOEN   1,817,569
DETACHABLE CLAMP HEAD RAILROAD SPIKE
Filed Dec. 12, 1930   2 Sheets-Sheet 1
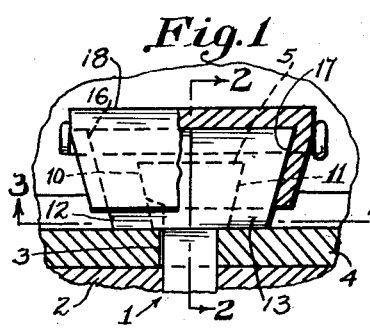
Fig.1
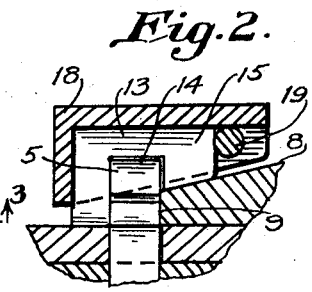
Fig.2
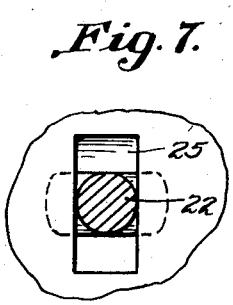
Fig.7
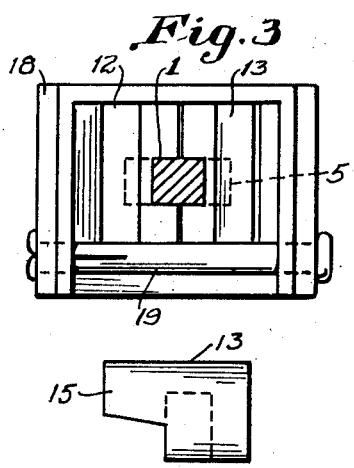
Fig.3
Fig.4
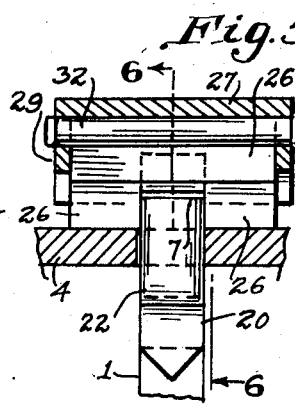
Fig.5
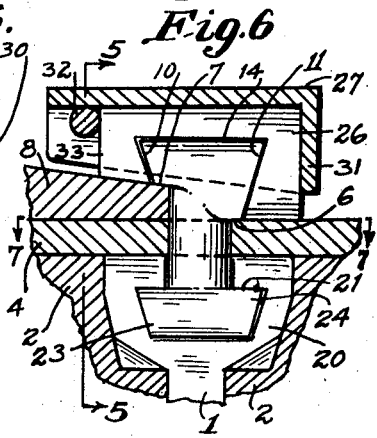
Fig.6
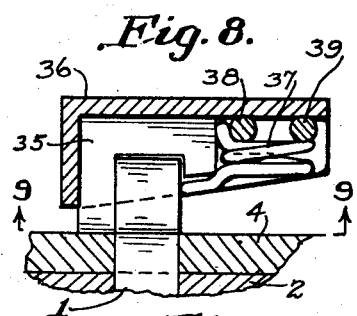
Fig.8
Fig.9
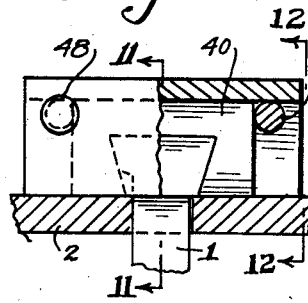
Fig.10
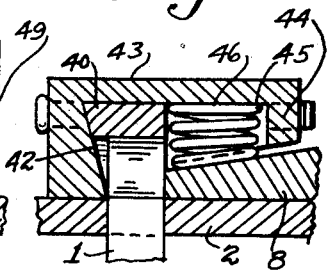
Fig.11
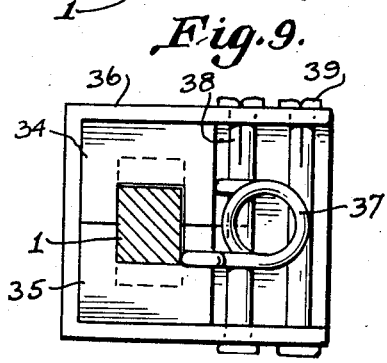
Fig.13
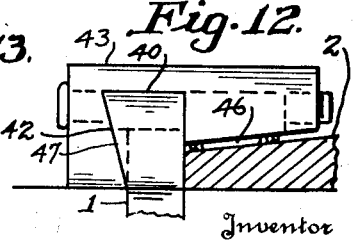
Fig.12
Inventor
Lew Koen
By Mason Fenwick Lawrence
Attorneys Aug. 4, 1931.  L. KOEN  1,817,569
DETACHABLE CLAMP HEAD RAILROAD SPIKE
Filed Dec. 12, 1930  2 Sheets-Sheet 2
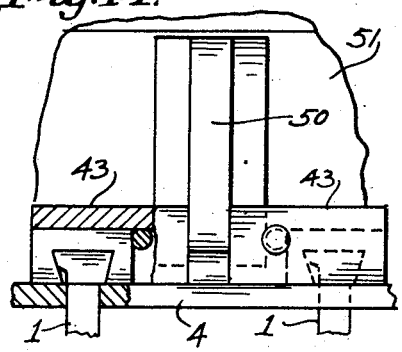
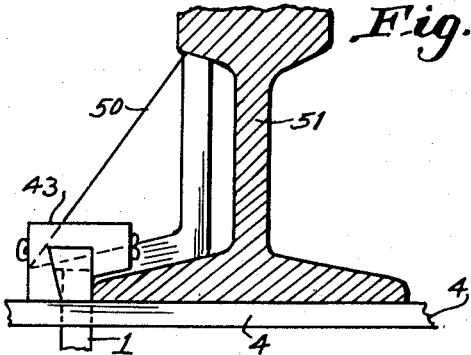
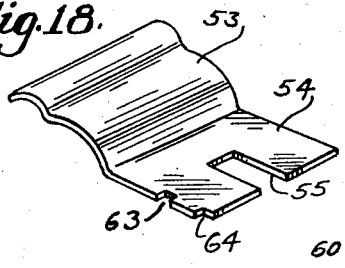
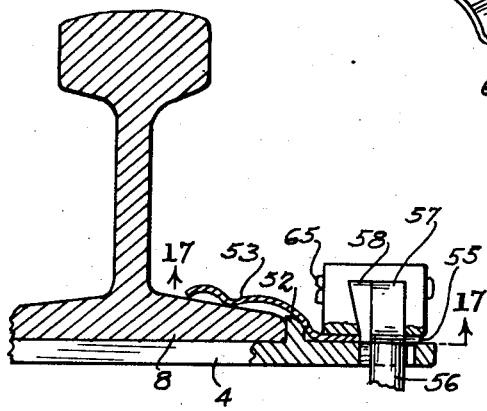
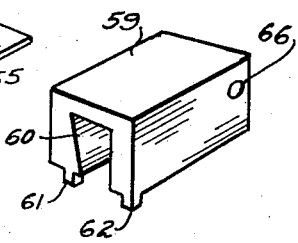
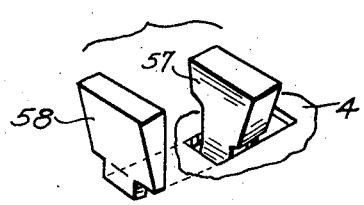
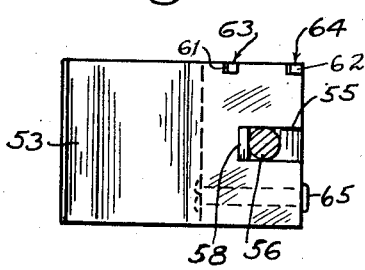
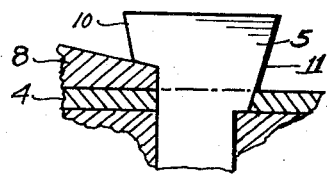
Inventor
Lew Koen
By Mason, Fenwick & Lawrence
Attorneys Patented Aug. 4, 1931

1,817,569

UNITED STATES PATENT OFFICE

LEW KOEN, OF WILKES-BARRE, PENNSYLVANIA

DETACHABLE CLAMP-HEAD RAILROAD SPIKE

Application filed December 12, 1930. Serial No. 501,947.

The invention forming the subject matter of this application is a detachable clamp-head railroad spike, adapted to be secured in part to railroad ties and the tie plates thereof, in such manner as to permit removal of the track rails from the ties or tie plates without necessitating removal of the spikes themselves.

As well known in this art, wherever the ordinary railroad spike is used to secure a section of track to the ties or tie plate and in which the head of the spike engages the bottom flange of the said track rail, it is necessary either to cut off the head of the spike or to pull the spike out bodily from the tie plate in order to permit the removal of the track rail from its supporting tie plate structure.

The removal of these spikes from the ties necessitates the plugging of the holes formed by such removal before the spike can be driven again into the ties in order to hold in position a track rail located thereon. This removal of the spike, and the plugging of the hole formed by such removal, are time consuming operations, the repetition of which eventually ruins the ties for any useful purpose and necessitates their removal from the track, with all the labor and loss of time involved in such removal.

The main object of the present invention, therefore, is to provide a spike designed to be permanently fixed in the railroad ties, and in one form thereof, to project bodily up alongside the flange of a track rail to provide means for detachably securing to said projecting part a clamping head which extends over and into contact with the base flange of the rail to hold the rail securely clamped to the ties.

In another form of the invention the object is to provide a spike which can be embedded in the tie during the process of manufacturing and preserving them and which is provided with a head extending either flush with or slightly below the face of the tie, and having a recess or dove-tail groove formed therein to adapt it for use with an attachment designed to project through the tie plate and into contact with the base flange of the rail thereon. In this form of the invention said attachment forms a sort of super-head which may be readily detached from the spike head by turning it substantially through an angle of 90 degrees from its locking position.

Another object of the invention is to provide locking and clamp plates adapted to be detachably connected to the head of the spike or the super-head above referred to and to extend into clamping relation with the flange of the adjacent track rail.

Still another object of the invention is to provide these detachable head clamps with means to prevent their accidental removal from the spike and to lock them in clamping position with the base flange of the track rail.

In another form of the invention the clamping heads above referred to are elongated to extend over the aforesaid base flange and a compression spring is mounted in the elongated end to seat upon the flange of a track rail and clamp it yieldingly to the tie plate or tie, as the case may be.

Another object of the invention is to shape the heads of the railroad spike either where the head is integral with the railroad spike or is detachably connected thereto, so as to provide a means for clamping a stiffening bracket in position on the base of a track rail without necessitating any extra spikes or other means for separately holding said stiffening brackets in operative position.

Another object of the invention is to provide railroad spikes of this character with a securing and clamping cap which not only engages the base flange of the track rail to clamp it to the tie or tie plate, but also serves as a protective covering for the head of the spike to prevent the elements from attacking the body of the spike embedded in the tie.

In another form of the invention a still further object is to provide a spring plate adapted to be detachably secured to a tie plate and extending over into yielding clamping contact with the base flange of the track rail, and adapted to be clamped securely to the head of a railroad spike by means of the protective cap above referred to, In all forms of the invention one of the main features resides in shaping the head of the spike whether in the solid spike form or in the detachable super-head form, so that this spike may in one position directly engage the flange of the track rail to clamp it to the tie or tie plate; and, in a position at right angles thereto, may be used with the secured elements and cover to form an anchor for holding the detachable clamping elements in clamping position.

Another object of the invention is to provide a spike with the head so shaped that one side of it engages the base flange of the track rail and the other side engages the tie plate or tie, thereby having a direct clamping action on both. Incidentally the head of the spike may be reduced so as to lie flush with a tie plate; and the shank of the spike may be of screw type, or any of the forms in common use.

Other objects of the invention will become apparent as the detailed description proceeds.

In the drawings:

Figure 1 is a side elevation of one form of my invention, with parts thereof broken away and parts shown in sections, to illustrate clearly the details of construction.

Figure 2 is a vertical transverse section taken on the line 2—2 of Figure 1.

Figure 3 is a horizontal section taken on the line 3—3 of Figure 1.

Figure 4 is a side elevation of one of the rail clamping elements forming part of the invention illustrated in Figures 1, 2 and 3.

Figure 5 is a central vertical section of a modified form of my invention, the section being taken on the line 5—5 of Figure 6.

Figure 6 is a vertical section taken on the line 6—6 of Figure 5.

Figure 7 is a horizontal section taken on the line 7—7 of Figure 6.

Figure 8 is a central vertical section of a modified form of my detachable rail clamping head.

Figure 9 is a horizontal section taken on the line 9—9 of Figure 8.

Figure 10 is a side elevation with parts thereof shown in sections, of still another form of my invention.

Figure 11 is a vertical transverse section taken on the line 11—11 of Figure 10.

Figure 12 is a side elevation of the form of detachable clamping head shown in Figures 10 and 11.

Figure 13 is a perspective of one of the head clamping elements illustrated in Figures 10 and 11.

Figure 14 is a front elevation of a reinforcing bracket adapted to be applied to a section of track rail and to be held in reinforcing and clamping position thereon by a pair of spikes having detachable clamping elements constructed according to any of the previously described forms of the invention.

Figure 15 is a side elevation of the reinforcing plate shown in Figure 14 as applied to a section of track rail, which is shown herein in transverse section.

Figure 16 is an end elevation of a modification of my invention in which a resilient clamping plate is used to hold a track rail in position on a tie or tie plate, and in which a clamping plate is detachably secured to the spike by means of the detachable clamping head thereof.

Figure 17 is a horizontal section taken on the line 17—17 of Figure 16.

Figure 18 is a perspective of the resilient clamping plate shown in Figure 16.

Figure 19 is a perspective of one of the detachable clamping elements shown in Figure 16.

Figure 20 is an exploded perspective of two of the aforesaid clamping elements, and Figure 21 is a side elevation of the head of the spike constructed according to the present invention either in the form where the head is integral with the shank, or forms a part of the super-head above referred to.

As shown in Figures 1 to 4, inclusive, the invention comprises a spike having the shank 1 driven into a railroad tie 2, through an aperture 3 formed in a tie plate 4. The head 5 is preferably shaped as shown more clearly in Figure 6; and is formed to provide a shoulder 6 adapted to seat against the upper face of the tie plate 4 to clamp this plate 4 to the tie 2. The head is also formed to provide a second shoulder 7, spaced axially from shoulder 6 a sufficient distance to engage and clamp the base flange 8 of a track rail when the shoulder 6 is in clamping contact with the tie plate 4.

This means that the head of the spike is adapted to be driven into the tie to cause its head to engage and clamp the base flange 8 of a track rail. However, this use of the spike would present litle advantage over the ordinary spike unless the head were designed to be detachably connected to the shank or main body of the spike as shown in Figure 6.

It is intended that the spike shall be driven into the tie 2, as shown in Figure 2 in such manner that one flat side of the spike contacts with the edge 9 of the base flange 8 and the head has the sloping plane sides 10 and 11 perpendicular to said edge 9. The two sides 10 and 11 form a dove-tail designed to a pair of dove-tail cap plates 12 and 13 grooved to fit snugly over the top 14 of the spike head, and to form an arm 15 shaped at its lower face to fit on the sloping upper face of the base flange 8. This pair of cap plates fits snugly over the dovetailed spike head and has its ends 16 and 17 also sloped to form a dovetail over which a correspondingly shaped cover plate 18 is slidably fitted. The inner end of the cover plate 18 extends beyond the flush inner ends of the cap plates 12 and 13, and has its opposite sides provided with registering apertures to receive the locking pin 19.

It will be apparent from inspection of Figures 1 to 4 that the cap plates are held in rail clamping position by the side of cap plate 19, and the sides 10 and 11 of the spike head. It will also be obvious that the cover plate 18 cannot be removed from cap plates 13 and 14 while the pin 19 is in place; and it is evident that when these cap and cover plates are removed from the spike head, the rail can be removed without disturbing the spike in its tie 2.

In the form shown in Figures 5, 6 and 7, the shank 1 of the spike is enlarged at one end to form a plate 20 having an undercut groove 21 formed there-through to receive the cylindrical shank 22 of a detachable head. The shank 22 is provided at its lower end with laterally extending lugs 23 and 24 adapted to be rotated in the undercut part of the groove 21 in order to lock the shank 22 against axial movement from the enlarged plate 20. The clamping structure connected to the head in this case is the same as that illustrated in Figures 5 and 6.

Where the detachable head of Figures 5 and 6 is used, the head itself is intended to be located in direct clamping contact with the base flange 8. In this case the detachable head is adapted to be inserted through an aperture 25 (see Figure 7) formed in the base plate of sufficient length to admit the lugs 23 and 24 at the lower end of said head and to permit the passage thereof through the groove 21 into the undercut part thereof. As soon as the head is thus inserted in the plate 20 it may be turned through an angle of 90 degrees until its shoulder 7 engages the upper face of the base flange 8. In this position plates 26 having a dovetailed groove may be slid onto the enlarged head of this detachable spike member, and when in position thereon a cover plate 27 may be placed over the plates 26, with its downwardly extending walls 29 and 30 engaging the side walls of the detachable spike head and the plates 26 to prevent relative lateral movement of the plates 26 and detachable spike head. The cover plate 28 has a downwardly extending end wall 31 in contact with one end of the plates 26 and the side walls 29 and 30 of this cover plate are provided with registering apertures to receive a locking pin 32 fitting snugly against the opposite narrow end of the plates 26, which, as shown in Figure 6 has a downwardly sloping lug 33 adapted to contact with the base flange 8 in alinement with the shoulder 7 to assist said shoulder 7 in holding the base flange of a track rail in contact with the tie plate 4.

In the form of the invention shown in Figures 8 and 9 the head of the spike is shaped similarly to the head shown in Figures 1 and 2, and cap plates 34 and 35 somewhat similar to the cap plates 12 and 13 are seated over the dovetailed head and are held in position by means of a substantially rectangular cover plate 36 which, however, projects beyond the cap plate a substantial distance to form a seat in which a compression spring 37 is arranged and held by engagement with a pair of locking pins 38 and 39. The spring is upturned at one end to be clamped between the pin 38 and the inner end of the plates 34 and 35, while the other end of the spring and part of the body thereof extends below the lower inclined edge of the cap plates 34 and 35. The spring 37 is designed to contact with the upper face of the base flange of the track rail in order to provide a strong yielding clamping action for retaining the track rail positioned on the tie plate.

In the form of the invention shown in Figures 10 to 13 a single cap plate 40 is provided with a dovetailed groove to slide over the dovetailed head of the rail spike and is also provided with a sloping face 41 designed to cooperate with a corresponding face 42 of a cover plate 43 to lock the cover plate and cap plate securely to the head of the spike. In this case, too, the rear end of the cover plate 43 is extended and provided with a downturned lip 44 which forms with the back face of the spike, and back face of the cap plate 40, a chamber 45, in which is seated a compression spring 46 adapted to contact with the upper face of the base flange 8 to clamp the latter yieldingly against the tie plate 2. The cover plate 43 is provided with a dovetailed groove 47 shaped to slide snugly over the correspondingly shaped sides of the cap plate 40.

When the cover plate 43 is centered over the cap plate 40, it may be secured in this position by means of the locking pins 48 and 49 extending from front to rear of the cover plate 43 and engaging the opposite flat ends of the cap plate 40. The construction of this detachable clamping mechanism and its operations will be obvious from inspection of Figures 11 and 12.

Any of the different forms of detachable head may be used to secure a reinforcing member or bracket 50 in proper bracing position against the base flange and head of the track rail 51 as shown in Figure 15. These braces are commonly designed for use on curves and other parts of a railroad track where the pressure on some of the rails is lateral as well as perpendicular to the base flange. The application of the detachable head mechanism forming the present invention to a track rail for the purpose of detachably clamping these reinforcing heads in position, will be obvious to persons skilled in the art by inspection of Figures 14 and 15.

In another form of the invention the tie plate 4 is provided with an outstanding flange 52 adapted to form a stop for one edge of the base flange 8. In this case it is desired to hold the track rail yieldingly on the tie plate; and, to effect this function a spring plate 53 is shaped to extend over the flange 52 and into contact with the upper face of the base flange 8. This plate 53 is also shaped to provide a flat part 54 having a slot 55 formed therein to permit the passage therethrough of the shank 56 of a railroad spike having a head 57 formed thereon as shown in Figure 20. With this type head, a wedge 58 is used and is placed alongside said head 57 to form a dovetail combination head. The combination head 57—58 is designed to receive a locking cover 59 having a central dovetailed slot 60 shaped to fit over the combination head 57—58.

The cover plate 59 is provided at one of its ends with downwardly projecting lugs 61 and 62 adapted to seat in corresponding recesses 63 and 64 formed in the spring plate 53. When the cover plate is slid over the combination head 57—58 until the lugs 61 and 62 seat in said recesses, the cover may be locked against movement in the other direction by means of a pin 65 passing through suitable registering apertures 66 formed in the front and rear walls of said cover plate 59, and contacting with an end wall of the combination head 57—58.

What I claim is:

1. The combination with a railroad tie of a track rail seated thereon, a spike bedded in said tie and having the upper end thereof slotted, a head having one end thereof detachably seated in said slot and having the other end in clamping engagement with said track rail.

2. The combination with a railroad tie of a track rail seated thereon, a spike having a dovetailed head extending from said tie alongside the base flange of said track rail, and means detachably connected to said head for clamping said base flange to the tie.

3. The combination with a railroad tie of a track rail seated thereon, a spike having a dovetail head extending from said tie alongside the base flange of said track rail, a dovetail grooved cap plate slidably fitted over said dovetail head and having a part thereof extending into clamping engagement with the base flange of said rail, a cover plate extending over said head and cap plate, and means for locking the cover plate in position on said head and cap plates.

4. The combination with a railroad tie of a track rail seated thereon, a stiffening bracket mounted on the base flange of said rail, and in contact with the head of said rail, spikes bedded in the said tie, and means detachably connected to the head of said spikes and engaging said bracket and base plate to clamp the rail to said tie and the bracket to said rail.

5. The combination with a railroad tie of a track rail seated thereon, a stiffening bracket mounted on the base flange of said rail, spikes bedded in said tie and having dovetailed heads projecting upwardly alongside one edge of the base flange of said rail, and dovetailed caps interlocked with said heads to clamp the rail to said tie and the said bracket to said rail.

In testimony whereof I affix my signature.

LEW KOEN.